(12) United States Patent
Maruyama (10) Patent No.: US 10,152,333 B2
(45) Date of Patent: Dec. 11, 2018

(54) NETWORK BOOT SYSTEM (71) Applicant: CO-CONV, Corp., Kyoto-shi, Kyoto (JP)

(72) Inventor: Shin Maruyama, Toyonaka (JP)

(73) Assignee: CO-CONV, CORP., Kyoto-Shi (JP)

(*) Notice: Subject to any disclaimer, the term of this patent is extended or adjusted under 35 U.S.C. 154(b) by 0 days.

(21) Appl. No.: 14/240,664

(22) PCT Filed: Feb. 26, 2013

(86) PCT No.: PCT/JP2013/055009
§ 371 (c)(1),
(2) Date: Feb. 24, 2014

(87) PCT Pub. No.: WO2013/129420
PCT Pub. Date: Sep. 6, 2013

(65) Prior Publication Data
US 2014/0237224 A1    Aug. 21, 2014

(30) Foreign Application Priority Data
Feb. 28, 2012  (JP) ................................ 2012-042528

(51) Int. Cl.
G06F 9/44        (2018.01)
G06F 9/4401      (2018.01)

(52) U.S. Cl.
CPC .......... *G06F 9/4416* (2013.01); *G06F 9/4401* (2013.01); *G06F 9/4406* (2013.01)

(58) Field of Classification Search
CPC ..... G06F 9/4401; G06F 9/4406; G06F 9/4416
See application file for complete search history.

(56) References Cited

U.S. PATENT DOCUMENTS

| | | | | |
|---|---|---|---|---|
| 6,658,541 B2* | 12/2003 | Kitamura | ............... | G06F 3/0601 707/999.008 |
| 2004/0153694 A1* | 8/2004 | Nicholson | ............. | G06F 9/4416 714/6.31 |
| 2007/0005883 A1* | 1/2007 | Trika | .................... | G06F 9/4418 711/113 |
| 2011/0265083 A1* | 10/2011 | Davis | .................. | G06F 12/0866 718/1 |

FOREIGN PATENT DOCUMENTS

WO    2009/145274 A1    12/2009

* cited by examiner

*Primary Examiner* — Jaweed A Abbaszadeh
*Assistant Examiner* — Gayathri Sampath
(74) *Attorney, Agent, or Firm* — AEON Law, PLLC; Adam L. K. Philipp; David V. H. Cohen (57) ABSTRACT

[SUBJECTS] In a network boot system having a read cache mechanism, the subject is to suppress a decreased boot time of a terminal due to an access with respect to a local disk. [SOLVING MEANS] Network boot system 100 includes server 10 and terminal 20 having recording device 22a connecting each other through network 30. The terminal includes a read cache mechanism that stores a cache in a read cache region by a read cache driver. The read cache mechanism includes a mapping table that indicates an address of the read cache region corresponding to an address of data that was at a reading time from the server, a means that sequentially and in order stores the data that was at the reading time from the server from a top side, a means that stores the address with respect to the cache, and when using the cache data, the read cache mechanism accesses the address of the read cache region based on the mapping table.

8 Claims, 5 Drawing Sheets

*Prior Art*

*Fig. 5*

NETWORK BOOT SYSTEM

TECHNICAL FIELD

The invention relates to a network boot system that boots an operating system through a network.

BACKGROUND

In these days, in a system that boots an operating system (hereinafter OS) through a network, it has been known in general to provide a part of a physical storage device at a client terminal side, in order to reduce a load to a network boot server, with a read only cache (hereinafter read cache mechanism).

In patent document 1, a network boot system, with which a read cache mechanism is provided in the network boot system, is disclosed. In the mechanism, network accesses to a server are reduced by caching a virtual disk on a network boot server in a local disk of PC (a client terminal) that an end user uses. In such a network boot system, even when a plurality of client terminals are simultaneously booted, there are barely accesses to the network at the second boot time or later. Therefore, the booting of these client terminals becomes fast.

PRIOR ART RELATED DOCUMENT(S)

Patent Document

[PATENT DOCUMENT 1] International Publication No. 09-145274

SUMMARY OF INVENTION

Subjects to be Solved by Invention

As described above, according to the conventional network boot system provided with the read cache mechanism, it is expected that the more data client terminals accumulate in their caches, the faster the booting of the terminals must become because of a reduction of network accesses to the server. However, in actual operations, it has been observed that the boot speed of terminals in which adequate caches are accumulated becomes slower against its design purpose.

When the inventor focused on a local disk in which a cache of a terminal is accumulated, it was obvious that a head seek of the local disk increases at a boot time of the terminal and that accesses to the local disk frequently occur.

The present invention was made considering the above subject. A main technical subject is to suppress the reduction of the boot speed of the terminals caused by access to the local disk at a boot time of the client terminal in a network boot system provided with a read cache mechanism.

Means for Solving Subjects

A network boot system of the present invention includes a client terminal that has a physical storage device, a network boot server that provides a disk image as a virtual disk, the disk image including an operating system (OS) operating on the client terminal, the network boot server and the client terminal being connected through a network, the client terminal having a physical memory that temporarily stores data that is necessary at a boot time of the OS and a network interface for accessing the server through the network, and the OS having a read cache driver for driving the storage device, and a read cache mechanism that, when the read cache driver receives a read request signal from the client terminal, stores data that was read from the server at reading time as cache data in a read cache region of the storage device. Further, the read cache mechanism has a mapping table that indicates an address of the read cache region corresponding to an address of the data at the reading time from the server, a cache storing means that in order and sequentially stores the data at the reading time from the server from a top side of the read cache region, the data being at the reading time from the server, a table storing means that stores the address of the data that was at the reading time from the server and the address of the read cache region, these addresses corresponding to each other, and when using the cache data, the read cache mechanism accesses the address of the read cache region based on the address of the data that was at the reading time from the server and the mapping table.

With the configuration, by accumulating the data read from the server as cache data in a region that is sequential from the top side of the cache region, cache data that was previously stored in several different regions is to be stored only in a region that is sequential from the top side of the cache region. Thereby, access time to the cache data is shortened.

The read cache mechanism may include means for transferring the mapping table to the physical memory at the terminal boot time, and for transferring information all together to the physical memory in order and sequentially from the top side of the read cache region, the information being necessary mainly at the terminal boot time. When using the cache data, the read cache mechanism may mainly access an address of a cache region transferred to the physical memory based on the mapping table that was transferred to the physical memory at the terminal boot time.

With the configuration, the terminal is booted, with barely accessing the cache region in the local disk during the terminal booting, by mainly accessing the mapping table and cache data that are transferred to the physical memory.

The read cache mechanism may include an initializing means that preliminarily initializes the read cache region before securing the read cache region, and store cache data in the read cache region after initializing the read cache region with the initializing means.

With the configuration, information that is necessary at the terminal boot time is accumulated at the top side of the cache region. Thereby, when transferring the information that is necessary at the terminal boot time in order and sequentially from the top side of the read cache region, the amount of the cache data to be transferred to the physical memory can be reduced.

The storage device may further include a cache management region that stores at least the maximum value of a capacity of the read cache region. With the configuration, it is realized to restrict the cache data stored in the read cache region. The capacity of the read cache region was conventionally required to be the same capacity as the disk image at the server side. It is, however, possible that the maximum value of the capacity of the read cache region is set smaller in advance than the capacity of the disk image.

An address indicating an end of cache data may be stored in the cache management region. With the configuration, it is realized that the cache is easily stored at the end of the cache data of the cache management region. Also, it is possible that, when the cache data excesses the maximum value of the capacity of the read cache region, an operation of the read cache mechanism is canceled/suspended in order not to accumulate the cache data.

The read cache mechanism may accumulate cache data in the read cache region by a following order using the address indicating the end of the cache data.

(a) moving an end marker only with a size of the cache data in which the end maker of the read cache region is accumulated, storing the end marker that was moved,
(b) storing the cache data to be accumulated in the end of the read cache region, and
(c) storing, in the mapping table, an address of the cache data to be accumulated at the server side and the address of the read cache region, these addresses corresponding to each other.

Advantages of Invention

In a network boot system related to the present invention, access time to cache data is shortened by accumulating data read from a server as cache data in a sequential region from a top side of a cache region.

Further, when the read cache mechanism is provided with a transferring means that transfers a mapping table to a physical memory at a terminal boot time and transfers information all together that is necessary mainly at the terminal boot time in order and sequentially from the top side of the read cache region, a terminal is booted by mainly accessing the mapping table and the cache data transferred to the physical memory.

Further, when the read cache mechanism secures the read cache region, means which initializes the read cache region is provided. Where the cache data is stored in the read cache region after the read cache region was initialized by the initializing means, the information necessary at the terminal boot time can be stored at the top side of the cache region.

With any configurations above, it is realized to suppress the reduction of the boot speed of the client terminals caused by access with respect to the local disk.

EMBODIMENTS FOR IMPLEMENTING INVENTION

First Embodiment

Hereinafter, the first embodiment of a network boot system related to the present invention is described in detail referring to the drawings. First, one embodiment of the network boot system provided with a read cache mechanism according to the present invention is exemplarily explained. Descriptions for each embodiment should be purposefully interpreted in order to understand a technical thought of the present invention. The thought should not be limited with the descriptions of these embodiments.

(1) Entire Configuration of Network Boot System

Figure 1:
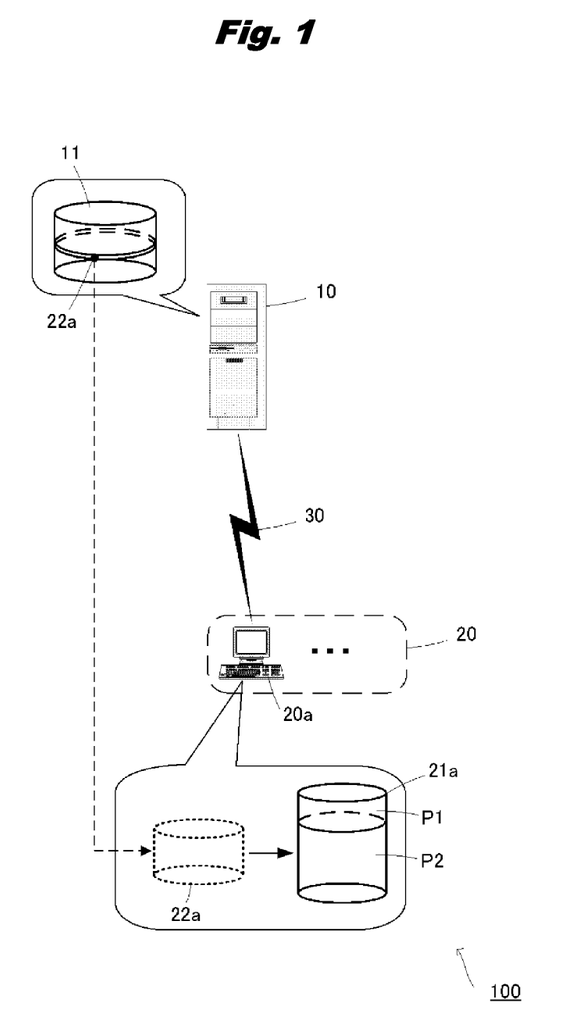
FIG. 1 is a conceptual diagram illustrating a basic configuration of a network boot system according to a first embodiment.

FIG. 1 is a conceptual diagram illustrating a basic configuration of a network boot system according to a first embodiment. As FIG. 1 illustrates, in a network boot system 100, a server 10 and a plurality to client terminals 20 (20a, . . . ) are connected through a network 30. The server 10 is provided with a physical disk 11, the terminal 20 is provided with a physical disk 21a as a physical storage device, and each is provided with basic components like a CPU, physical memory etc. that are not shown in the drawings. In the physical disk 11, a disk image 22a of OS that is read by each of the terminals 20 (20a, . . . ) at first boot time. Also, the physical disk indicates a hard disk drive or any storage devices that are materially formed. The physical disk 21a includes a first partition P1 that is recognized at a logical level and a second partition P2 that is recognized at a physical level. To the second partition P2, mainly the read cache region and cache management region are assigned.

For a basic operation of the terminal 20a, by a filter driver of the terminal 20a converting a read and write access to the physical disk 21a into a network access, a CPU of the terminal 20a accesses a disk image 22a on the server 10 that is connected through the network using a network interface instead of accessing the physical disk 21a. The terminal 20a is provided with a read cache driver for functioning the read cache mechanism. The read cache driver is a program, mainly operates a data access (writing and reading) with respect to the read cache region in the physical disk 21a. The read cache driver functions to store data read from the server 10 in the physical disk 21a, and to do a read cache. Also, it may be practical not to use cache data that has ever been written even once after the data is cached using a management flag.

Figure 5:
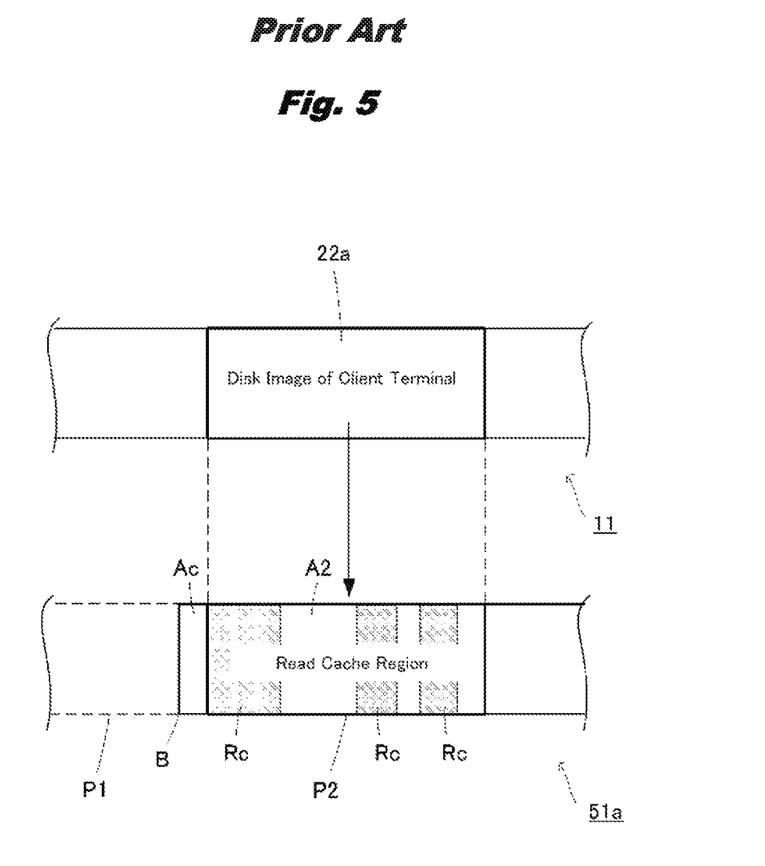
FIG. 5 is a conceptual diagram illustrating a management of a conventional read cache region.

FIG. 5 is a conceptual diagram illustrating a management of a conventional read cache region. As illustrated in FIG. 5, in the conventional read cache region A2, the same capacity as the disk image of the terminal 20a has been secured, and the cache data was stored in order to have relatively the same address to the disk image of the terminal 20a. With such a configuration, because the cache done region Rc is distributed among several regions in the read cache region A2, random accesses to the disk 51a frequently occur at boot time of the terminal 20a. In accordance with that, head seeks frequently occur. When a write cache mechanism on the disk 51a of a terminal is further provided in order not to use data that have been written even if the data is already cached, in accordance with the configuration, accesses to the 51a also increase more. Because the random accesses frequently occur, the head seek occurs more frequently.

(2) Dynamic Management of Read Cache Region

Figure 2:
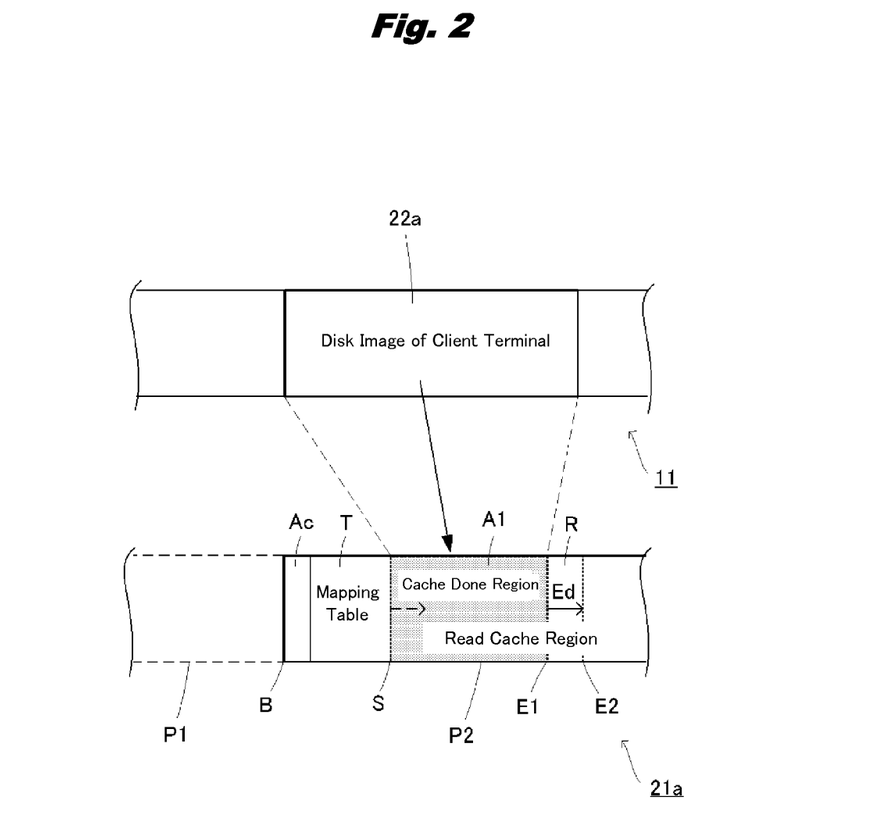
FIG. 2 is a conceptual diagram illustrating a dynamic management of a read cache region according to the first embodiment.

FIG. 2 is a conceptual diagram illustrating a dynamic management of the read cache region according to the first embodiment. As illustrated in FIG. 2, the physical disk 21a includes a first partition P1 and a second partition P2. Also, in the physical disk 21a, the first partition P1 and the second partition P2 are divided into two at a boundary B of the partitions. The second partition P2 includes a cache management region Ac, a mapping table T, and a read cache region A1. In the cache management region Ac, the maximum value of the capacity of the read cache region A1 is stored as a cache management header.

The mapping table T is a corresponding table indicating addresses of the read cache region A1 corresponding to addresses of data at the read timing from the server 10.

Specifically, the mapping table T is a corresponding table in which addresses of the disk image of client terminals 20a, which is otherwise addresses of data read from the server 10 by the read cache driver and is stored in the physical disk 11 at the server 10 side, correspond to addresses of cache done region A1. For example, the read cache driver, by using the addresses at the read timing from the server 10 and the mapping table T, accesses the cache done data of the disk image of the client terminals 20a. In the mapping table T, four bytes are required for one registration. When cache data stored in the read cache region A1 is managed by one sector unit (512 bytes), a side of the mapping table T becomes approximately 320 M bytes for a 40 G byte disk image of a client terminal 20a. Because it takes long time to store data when the size of the mapping table T is excessively large, it is preferred to reduce the side of the mapping table T by enlarging a unit for managing cache data. For example, when cache data is managed with 4096 byte unit, the side of the mapping table T with respect to a 40 G byte client terminal 20a becomes approximately 40M bytes.

Figure 3:
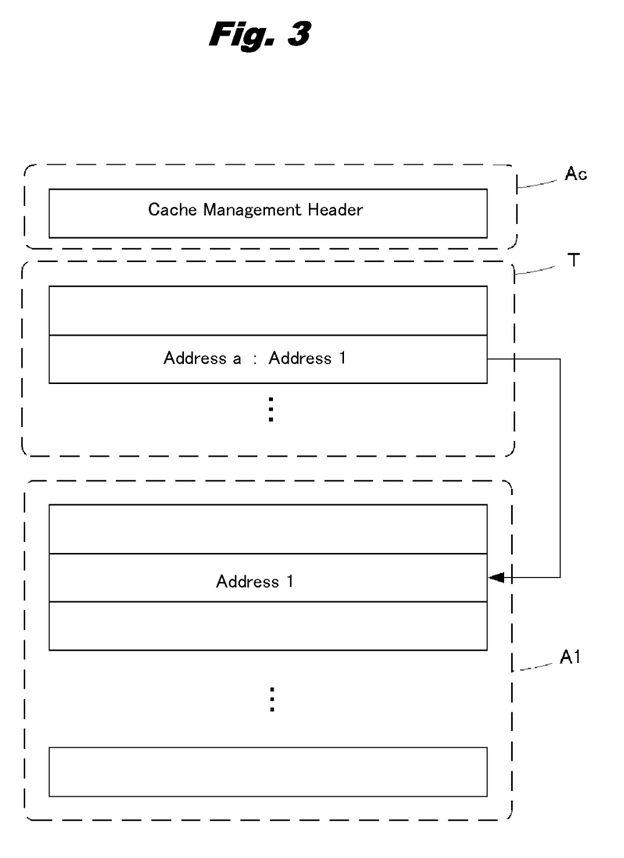
FIG. 3 is a diagram illustrating, of the first embodiment, a cache management header, a mapping table, and a read cache region.

FIG. 3 is a diagram illustrating, of the first embodiment, a cache management header, the mapping table, and the read cache region. As illustrated in FIG. 3, accessing data stored at an address a of the disk image of the client terminal 20a, the read cache driver accesses an address 1 of the read cache region A1 based on the mapping table T.

In the read cache region A1, as illustrated in FIG. 2, the cache data is sequentially stored in a reading order that the read cache driver reads data of a disk image of the client terminal 20a, and in an arrow direction with a broken line from an address S at a top side.

Processes are described below for storing cache data R in the read cache region A1. In the read cache region A1, for example, the read cache driver manages an end of cache done data using a maker (hereinafter as end marker) that indicates how far the cache data accumulate. The end marker E is an address indicating the end of the cache data.

(a) First, as illustrated in FIG. 2, by moving an end marker E1 of the end of the read cache region A1 in an arrow direction (or rearward) only by Ed, the end of the read cache region A1 is stored as an end marker E2 in a cache management region Ac.

(b) Next, the cache data R is stored at the end of the read cache region A1 (or rear side from the end marker E1).

(c) Next, an address with respect to the cache data R is added to the mapping table T, and the mapping table T is stored. Also, when the end marker E2 reaches the maximum size of the read cache region A1, cache data no longer accumulate.

Because it will take longer time to store the mapping table T and end maker E if it is performed at every time the cache data accumulates in the read cache region A1, it is preferred to perform periodically, for example one time every around one minute.

In the network boot system of the first embodiment, by dynamically managing the read cache region A1 with the mapping table T, the read cache region A1 becomes cache done region, and the cache done region is limited within a region that is sequential from address S of the top side of the read cache region A1, access time for the cache data is reduced. Also, because it is not necessary to secure the same capacity in advance as the disk image of the client terminal 20a, which is different from a convention read cache region A2, the maximum capacity of the read cache region A1 is reduced.

In the network boot system of the first embodiment, the cache data may be accumulated by a conventional method that is illustrated in FIG. 5 and the new method in which data is accumulated by dynamically managing according to the mapping table T.

Second Embodiment

Figure 4:
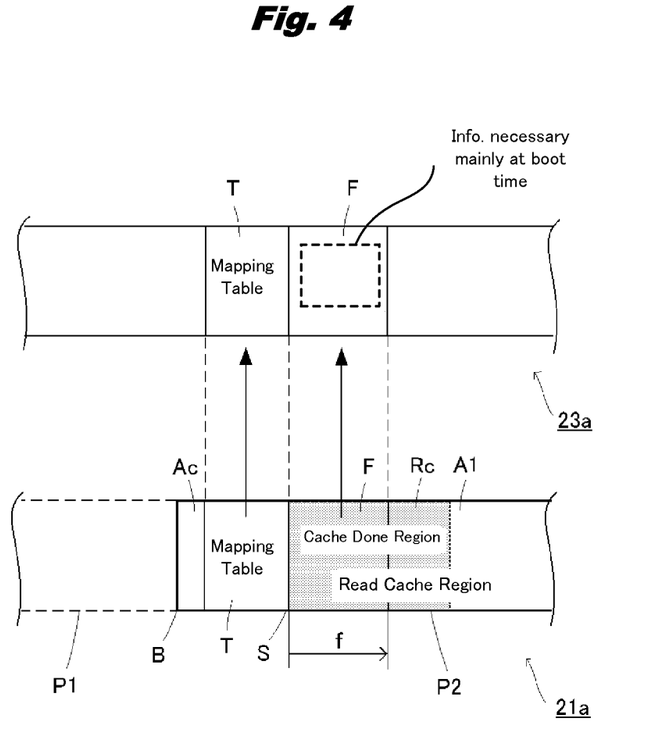
FIG. 4 is a conceptual diagram illustrating a transfer process of a physical memory of a client terminal in a network boot system according to a second embodiment.

FIG. 4 is a conceptual diagram illustrating a transfer process of a physical memory of a client terminal in a network boot system according to a second embodiment. In the network boot system of the second embodiment, a method is disclosed in which the network boot system 100 of the first embodiment is used as a main component, and read/write access to a physical disk 21a is reduced at a boot time of a client terminal.

As illustrated in FIG. 4, a client terminal 20a transfers a mapping table T and a cache done region F (actually data stored therein) all together to a physical memory 23a at a boot time. In the cache done region F, information that is necessary mainly at the boot time is stored. The cache done region F is transferred to the physical memory 23a in order and sequentially from address S at the top side of the read cache region A1. Thereby, the access of the read cache region A1 is reduced at the boot time of the client terminal 20a.

In the network boot system of the second embodiment, since information that is necessary mainly at the boot time of the client terminal 20a is stored in a physical memory of a terminal, it is realized that the terminal 20a is booted with the access of the read cache region A1 being reduced.

Herein, for example, at a timing for securing a region used for the read cache region A1 with a read cache driver, by initializing the region used for the read cache region A1 and by completely erasing the data in the region, thereafter, cache data is sequentially accumulated in the read cache region A1 by booting the client terminal 20a, information that is necessary mainly at the terminal boot time is accumulated at the address S side of the read cache region A1.

Therefore, when the region used for the read cache region A1 is secured, by accumulating the cache data in the cache region A1 after completely erasing the data in the region used for the read cache region A1, information that is necessary mainly at the boot time of the client terminal 20a is accumulated in the cache done region F shown in FIG. 4. Also, the cache done region F is around 300 to 400 M bytes in case of a general OS.

Accordingly, only by all together transferring the read cache region F to the physical memory 23a in order and sequentially from the address S at the top side of the second partition P2, the access of the read cache region A1 is reduced with the read cache data of the physical memory 23a, causing the terminal 20a to be booted.

In order to evaluate the network boot system of the embodiment, boot time of each of the client terminals were measured under conditions (1) to (4) below with the following network boot server and client terminal:
(i) Network Boot Server
CPU: Xeon (registered trademark) L5410 2.33 GHz×2
Memory: 16 GB
OS: Windows (registered trademark) Server 2008 Standard SP2 (×64)
(ii) Client Terminal (Express 5800/51Ma)
CPU: Core2Duo T7500 2.20 GHz×1
Memory: 4 GB
OS: Windows (registered trademark) 7
HDD: 149 GB (HTS545016B9A300)

The network boot server and client terminal were connected with Gigabit Ethernet (GbE). The boot time was measured in a sharing state in which another client terminal was connected the network boot server. It was confirmed that there are rooms in a CPU load and memory capacity of the network boot server, barely affecting the measurement.

Condition (1): normal network boot system without the read cache mechanism

Condition (2): network boot system using a conventional read cache mechanism

Condition (3): network boot system of the first embodiment

Condition (4): network boot system of the second embodiment

Measured Results of Boot Time (Sec)

|  | Condition (1) | Condition (2) | Condition (3) | Condition (4) |
| --- | --- | --- | --- | --- |
| Measurement I | 125.4 | 118 | 89 | 64.5 |
| Measurement II | 152.4 | 155 | 104 | 71 |

Herein, Measurement I indicates time (or period) which is defined from a boot start of the OS up to that a logon screen is displayed. Measurement II indicates time (or period) which is defined from that a desk top is displayed following the boot start of the OS up to that a start menu is displayed in response to predetermined keys of a keyboard that are pressed down. Input time of identification (ID) or password for the logon is not included.

According to the above measured result of the boot time, it is clear that the boot time of client terminal was shortened by reducing the random access to the physical disk at the terminal boot time.

In the second embodiment, it is explained where cache data, which is read in the physical disk mostly, is used. However, it may be practical to use separately or together the cache data read in the physical memory and the cache data stored in the physical disk

EXPLANATION OF REFERENCES

10: server (network boot server)
11: physical disk (hard disk)
20: client terminal
20*a*: client terminal
21*a*: disk
22*a*: virtual disk (vDisk)
23*a*: physical memory
30: network
100: network boot system
A1: read out cache region
P1: first partition
P2: second partition
F: cache done region
Rc: cache done region
R: cache to be added

The invention claimed is:

1. A network boot system, comprising:
a client terminal that has a physical storage device, a network boot server that provides a disk image as a virtual disk, the disk image including an operating system (OS) operating on the client terminal, the network boot server and the client terminal being connected through a network, the client terminal having a physical memory that temporarily stores data that is necessary at a boot time of the OS and a network interface for accessing the server through the network, and the OS having a read cache driver for driving the physical storage device, and
a read cache mechanism that, when the read cache driver receives a read request signal from the client terminal, stores data that was read from the server at reading time as cache data in a read cache region of the physical storage device, wherein the read cache mechanism has a mapping table that indicates an address of the read cache region corresponding to an address of the data at the reading time from the server,
a cache storing means that in an order that data was read from the server, sequentially and contiguously stores the data at the reading time from the server from a top side of the read cache region,
a mapping table storing means that stores the address of the data that was at the reading time from the server and the address of the read cache region, these addresses corresponding to each other, and
when using the cache data, the read cache mechanism accesses the address of the read cache region based on the address of the data that was at the reading time from the server and the mapping table.

2. The network boot system according to claim 1, wherein the read cache mechanism includes means
for transferring the mapping table to the physical memory at the terminal boot time, and
for transferring information all together to the physical memory in order and sequentially from the top side of the read cache region, the information being necessary mainly at the terminal boot time, when using the cache data, the read cache mechanism mainly accesses an address of a cache region transferred to the physical memory based on the mapping table that was transferred to the physical memory at the terminal boot time.

3. The network boot system according to claim 2, wherein the read cache mechanism includes an initializing means that preliminarily initializes the read cache region before securing the read cache region, and stores cache data in the read cache region after initializing the read cache region with the initializing means.

4. The network boot system according to claim 1, wherein the storage device further comprises a cache management region that stores at least the maximum value of a capacity of the read cache region.

5. The network boot system according to claim 4, wherein an address indicating an end of cache data is stored in the cache management region.

6. The network boot system according to claim 5, wherein the read cache mechanism accumulates cache data in the read cache region by a following order using the address indicating the end of the cache data,
(a) moving an end marker only with a size of the cache data in which the end marker of the read cache region is accumulated, storing the end marker that was moved,
(b) storing the cache data to be accumulated in the end of the read cache region, and
(c) storing, in the mapping table, an address of the cache data to be accumulated at the server side and the address of the read cache region, these addresses corresponding to each other.

7. A network boot system, comprising:
a client terminal that has a physical storage device,
a network boot server that provides a disk image as a virtual disk, the disk image including an operating system (OS) operating on the client terminal, the network boot server and the client terminal being connected through a network, the client terminal having a physical memory that temporarily stores data that is necessary at a boot time of the OS and a network interface for accessing the server through the network, and the OS having a read cache driver for driving the physical storage device, and a read cache mechanism that, when the read cache driver receives a read request signal from the client terminal, stores data that was read from the server at reading time as cache data in a read cache region of the physical storage device, wherein the read cache mechanism has     a mapping table that indicates an address of the read cache region corresponding to an address of the data at the reading time from the server,     a cache storing means that in order and sequentially stores the data at the reading time from the server from a top side of the read cache region,     a mapping table storing means that stores the address of the data that was at the reading time from the server and the address of the read cache region, these addresses corresponding to each other, and when using the cache data, the read cache mechanism accesses the address of the read cache region based on the address of the data that was at the reading time from the server and the mapping table, the storage device further comprises a cache management region that stores at least the maximum value of a capacity of the read cache region, an address indicating an end of cache data is stored in the cache management region.

8. A network boot system, comprising:

a client terminal that has a physical storage device, a network boot server that provides a disk image as a virtual disk, the disk image including an operating system (OS) operating on the client terminal, the network boot server and the client terminal being connected through a network, the client terminal having a physical memory that temporarily stores data that is necessary at a boot time of the OS and a network interface for accessing the server through the network, and the OS having a read cache driver for driving the physical storage device, and a read cache mechanism that, when the read cache driver receives a read request signal from the client terminal, stores data that was read from the server at reading time as cache data in a read cache region of the physical storage device, wherein the read cache mechanism has     a mapping table that indicates an address of the read cache region corresponding to an address of the data at the reading time from the server,     a cache storing means that in order and sequentially stores the data at the reading time from the server from a top side of the read cache region,     a mapping table storing means that stores the address of the data that was at the reading time from the server and the address of the read cache region, these addresses corresponding to each other, and when using the cache data, the read cache mechanism accesses the address of the read cache region based on the address of the data that was at the reading time from the server and the mapping table, the storage device further comprises a cache management region that stores at least the maximum value of a capacity of the read cache region, an address indicating an end of cache data is stored in the cache management region, wherein the read cache mechanism accumulates cache data in the read cache region by a following order using the address indicating the end of the cache data, (a) moving an end marker only with a size of the cache data in which the end marker of the read cache region is accumulated, storing the end marker that was moved, (b) storing the cache data to be accumulated in the end of the read cache region, and (c) storing, in the mapping table, an address of the cache data to be accumulated and the address of the read cache region, these addresses corresponding to each other.

\* \* \* \* \*